United States Patent [19]
Atkins et al.

[11] Patent Number: 5,455,835
[45] Date of Patent: Oct. 3, 1995

[54] ARTICLE COMPRISING AN OPTICAL WAVEGUIDE LASER

[75] Inventors: Robert M. Atkins, Millington, N.J.; Jean-Marc P. Delavaux, Wescosville, Pa.; Victor Mizrahi, Bedminster, N.J.

[73] Assignee: AT&T Corp., Murray Hill, N.J.

[21] Appl. No.: 195,190

[22] Filed: Feb. 7, 1994

Related U.S. Application Data

[62] Division of Ser. No. 965,457, Oct. 23, 1992.

[51] Int. Cl.$^6$ ........................................................... H01S 3/30
[52] U.S. Cl. ........................... 372/6; 372/19; 372/703
[58] Field of Search ........................ 372/6, 19, 71, 372/108, 703

[56] References Cited

U.S. PATENT DOCUMENTS

| | | | |
|---|---|---|---|
| 4,725,110 | 2/1988 | Glenn et al. | 350/3.61 |
| 5,050,183 | 9/1991 | Duling | 372/6 |
| 5,136,600 | 8/1992 | Fidric et al. | 372/32 |
| 5,138,621 | 8/1992 | Goto et al. | 372/38 |
| 5,140,598 | 8/1992 | Tagawa et al. | 372/6 |
| 5,181,210 | 1/1993 | Chung et al. | 372/6 |
| 5,191,588 | 3/1993 | Dacquay | 372/22 |
| 5,218,608 | 6/1993 | Aoki | 372/6 |
| 5,229,876 | 7/1993 | Fatehi et al. | 372/6 |
| 5,239,607 | 8/1993 | da Silva et al. | 372/6 |
| 5,243,610 | 9/1993 | Murata | 372/6 |
| 5,268,910 | 12/1993 | Huber | 372/6 |
| 5,283,846 | 2/1994 | Toyonaka et al. | 385/27 |
| 5,295,209 | 3/1994 | Huber | 372/6 |
| 5,301,054 | 4/1994 | Huber et al. | 372/6 |

OTHER PUBLICATIONS

"Intensity Noise in Diode–Pumped Single–Frequency Nd:YAG Lasers and its Control by Electronic Feedback", by T. J. Kane, *IEEE Photonics Technology Letters*, vol. 2, No. 4, Apr. 1990.

"Continuously Tunable Single–Mode Erbium Fiber Laser", by G. A. Ball et al., *Optics Letters*, vol. 17, No. 6, Mar. 15, 1992, pp. 420–422.

"System Characterisation of High Gain and High Saturated Output Power, $Pr^{3+}$–Doped Fluorozirconate Fibre Amplifier at 1–3 μm", by R. Lobbett et al., *Electronics Letters*, vol. 27 (16), Aug. 1, 1991, Stevenage, Herts., GB.

"Effect of External Perturbations on $LiNdP_4O_{12}$ Lasers", by K. Otsuka, *IEEE Journal of Quantum Electronics*, vol. QE–15, No. 7, Jul. 1979, pp. 655–662.

"Short Single Frequency Erbium–Doped Fibre Laser", by J. L. Zyskind, *Electronics Letters*, vol. 28, No. 15, Jul. 16, 1992, Stevenage, Herts., GB.

"High Gain Two–Stage Amplification With Erbium–Doped Fibre Amplifier", by H. Masuda, *Electronics Letters*, vol. 26, No. 10, May 1, 1990, Stevenage, Herts., GB.

(List continued on next page.)

*Primary Examiner*—Rodney B. Bovernick
*Assistant Examiner*—Robert E. Wise
*Attorney, Agent, or Firm*—Eugen E. Pacher

[57] ABSTRACT

We have discovered that at least some optical waveguide lasers such as Er-doped fiber lasers are subject to excessive output amplitude fluctuations, including severe fluctuations when the laser is subjected to mechanical shock. We have determined that these highly undesirable fluctuations are due to a resonance phenomenon, and that the fluctuations can be at least substantially reduced by means of a feedback loop that makes the amplitude of the output of the pump laser responsive to the amplitude of the output of the waveguide laser. We have also discovered that the operation of a pump laser/waveguide laser combination is frequently improved if an appropriate non-reciprocal element (e.g., an isolator or a tilted wavelength filter) is placed between the two lasers. An exemplary embodiment of the invention comprises the feedback loop as well as the non-reciprocal element.

13 Claims, 6 Drawing Sheets

OTHER PUBLICATIONS

"Birefringence Effect of Optical Fiber Laser with Intracore Fiber Bragg Grating", by M. Douay et al., *IEEE Photonics Technology Letters*, vol. 4, No. 8, Aug. 1992, New York, US. European Search Report, The Hague, Jan. 28, 1994, Examiner M. Galanti.

"Narrow–linewidth Fiber Laser With Integrated Master Oscillator–Power Amplifier", by G. A. Ball et al., *Optical Fiber Communication Conference*, Feb. 2–7, 1992, San Jose, Calif., 1992 Technical Digest Series, vol. 5 Conference Edition, p. 97.

"Continuously Tunable Single Mode Erbium Fiber Laser", by G. A. Ball et al., *Optics Letters*, vol. 17, No. 6, Mar. 15, 1992, pp. 420–422.

"Intensity Noise in Diode–Pumped Single–Frequency Nd:YAG Lasers and its Control by Electronic Feedback", by T. J. Kane, *IEEE Photonics Technology Letters*, vol. 2, No. 4, Apr. 1990, pp. 244–245.

National Semiconductor Linear Applications Handbook, Jan. 1986, p. 114.

ARTICLE COMPRISING AN OPTICAL WAVEGUIDE LASER

This is a division of application Ser. No. 07/965,457 filed Oct. 23, 1992.

FIELD OF THE INVENTION

This application pertains to articles, exemplarily an optical fiber communication system, that comprise an optical waveguide laser, exemplarily an Er-doped optical fiber laser.

BACKGROUND OF THE INVENTION

Optical waveguide lasers are currently of considerable interest. For instance, single mode Er-doped optical fiber lasers are currently considered to be strong candidates for use as signal radiation sources in optical fiber communication systems. See, for instance, G. A. Ball et al., Optical Fiber Communication Conference, Feb. 2–7, 1992, San Jose, Calif., "1992 Technical Digest Series", Vol. 5 Conference Edition, p. 97. Pr-doped waveguide lasers and amplifiers are also of current interest.

Optical waveguide lasers potentially have advantages over semiconductor laser sources. For instance, the former inherently have a simple structure, can easily be produced to emit a predetermined wavelength, and can be readily continuously tuned. See, for instance, G. A. Ball et al., *Optics Letters*, Vol. 17(6), p. 420.

In view of the intrinsic simplicity of optical waveguide lasers, those skilled in the art had, up to now, not had any reason to doubt that an otherwise appropriate waveguide laser would have an output that is stable enough to meet the (very exacting) stability requirements for use as a signal radiation source in an optical communication system. Typically such systems are designed to achieve a bit error rate (BER) of less than $10^{-9}$, even less than $10^{-12}$. This implies the need for a very stable laser.

It is known that diode-pumped Nd:YAG lasers can be subject to relaxation oscillations, which add considerable noise to the laser output, typically in the frequency range 100 kHz–1 MHz. See T. J. Kane, *IEEE Photonics Technology Letters*, Vol. 2(4), p. 244. That paper reports the presence of a relaxation oscillation peak at 280 kHz in an exemplary diode pumped single frequency monolithic Nd:YAG laser. The paper also reports that provision of appropriate feedback can effectively remove the relaxation oscillation intensity noise from the output of the Nd:YAG laser, and FIG. 2 of the paper shows a block diagram including the feedback loop.

The luminescing species in Er-doped fiber amplifiers and lasers is $Er^{3+}$. It is known that, in a $SiO_2$-based matrix, the relevant electron transition of $Er^{3+}$ has a long lifetime, exemplarily about 10 ms.

Optical waveguide lasers advantageously comprise in-line refractive index gratings. See, for instance, U.S. Pat. No. 4,725,110. U.S. patent application Ser. No. 07/878,802, incorporated herein by reference, discloses an advantageous method of making such a grating.

The Invention

Figure 1:
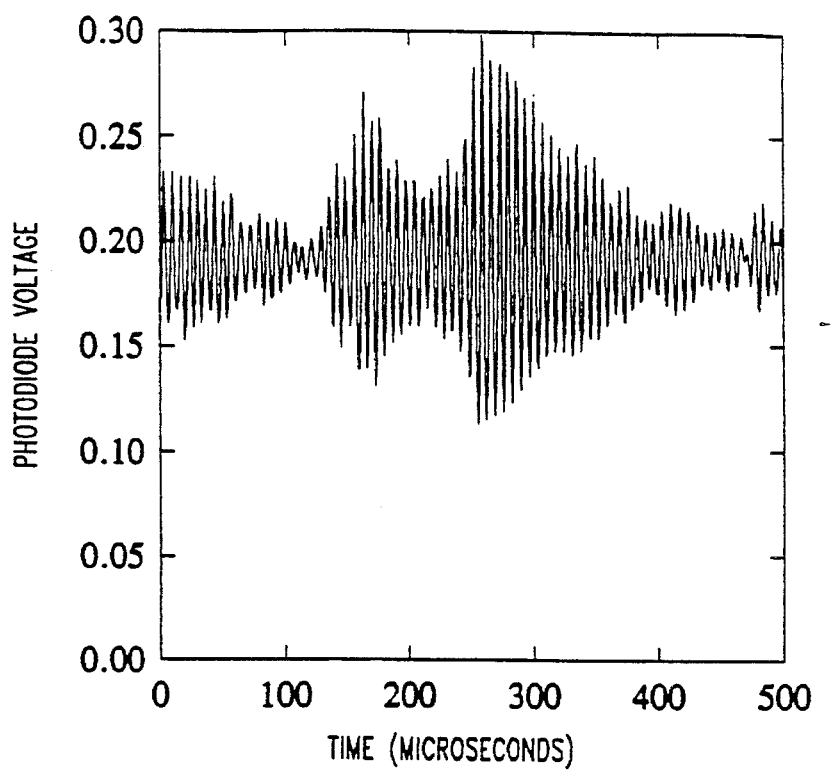
FIGS. 1 and 3 show the output of an exemplary optical fiber laser without feedback.
Figure 3:
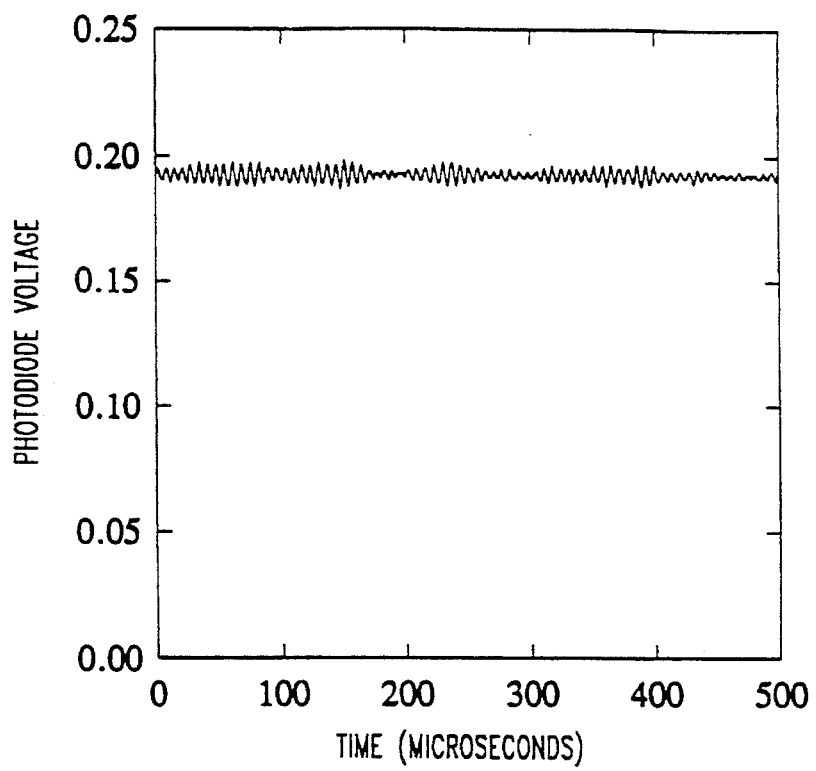

We have made the unexpected discovery that at least some, otherwise quite suitable for use in optical communication systems, optical waveguide lasers are subject to excessive output amplitude fluctuations, including severe fluctuations when the laser is subjected to mechanical shock. See, for instance, FIG. 1, which shows the amplified output of an exemplary $SiO_2$-based single mode Er-doped optical fiber laser as a function of time, the output exhibiting severe vibration-induced noise bursts. See also FIG. 3, which shows the amplified output of the laser as a function of time, the output exhibiting fluctuations at a frequency of about 150 kHz. Thus, a technique for eliminating or at least reducing vibration-induced amplitude fluctuations in optical waveguide lasers (including, but not limited to Er- and Pr-doped lasers) is of great commercial significance since, without such a technique, the suitability of such lasers for, e.g., demanding communication purposes may be in question. Advantageously such a technique would be simple and inexpensive, and can result in substantially unconditionally stable lasers. This application also discloses such a technique.

In view of the known long lifetime of $Er^{3+}$ in silica, it appeared at first unlikely to us that feedback could suppress oscillations at frequencies of the order of 100 kHz. Indeed, even the source of the observed fluctuations was unclear and, consequently, a solution to the fluctuation problem was not apparent. For instance, we had previously observed self-pulsation in some high gain Er-doped fiber lasers, and had identified Er-clusters as the likely cause of the problem.

Figure 9:
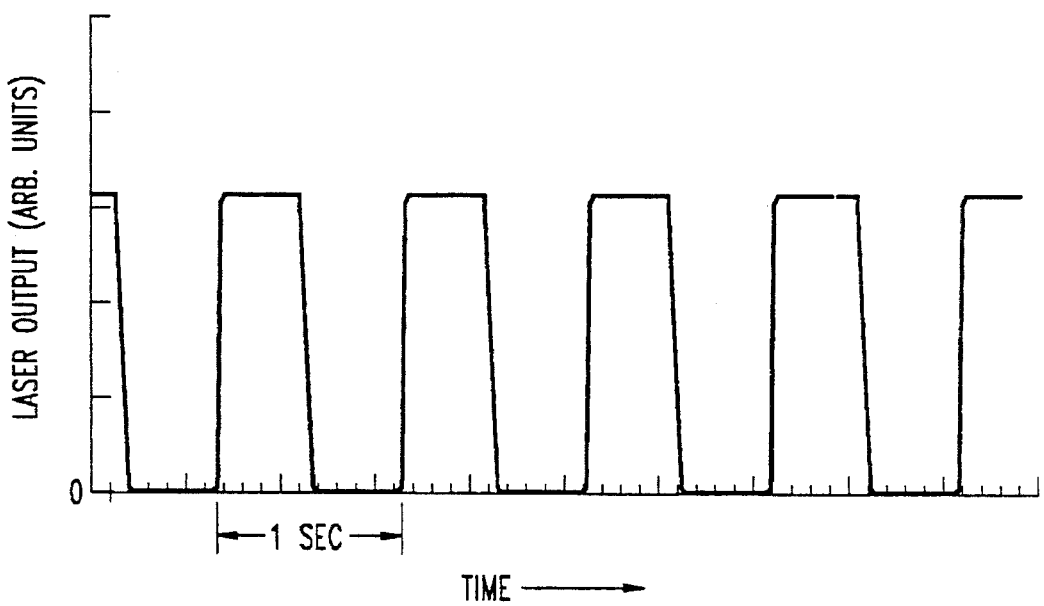
FIGS. 9 and 10 show exemplary data on fiber laser output vs. time, with the pump laser 100% modulated at 1 and 10 Hz, respectively.
Figure 10:
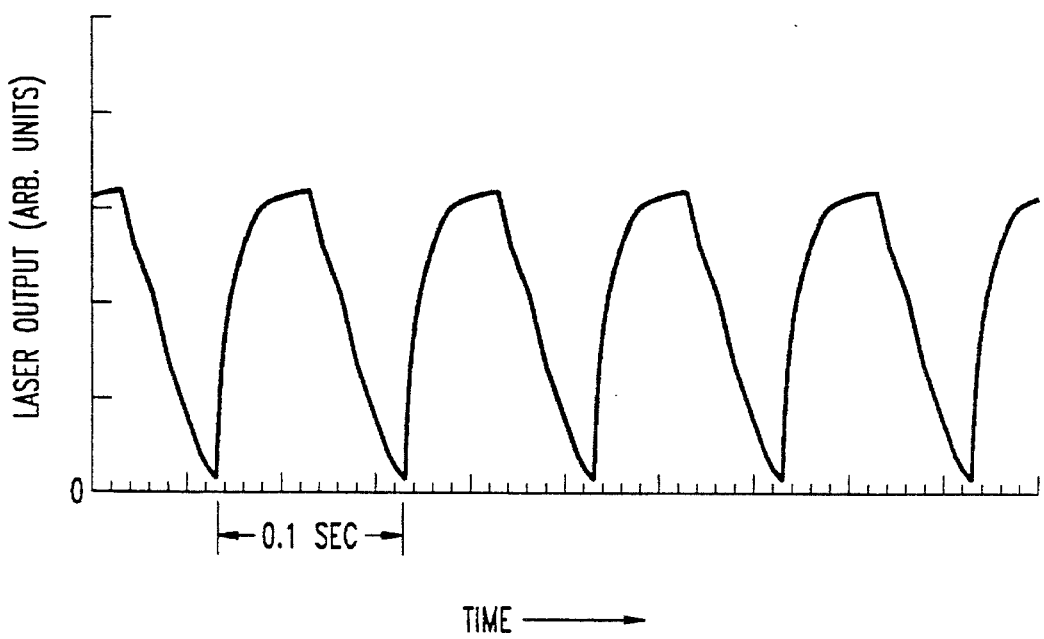

FIGS. 9 and 10 illustrate the limits placed by the long $Er^{3+}$ lifetime on the ability of an Er-doped fiber laser to follow even very low frequency pump radiation modulation. As FIG. 9 shows, the laser can relatively faithfully follow a 1 Hz 100% square wave modulation of the pump radiation. However, as demonstrated by FIG. 10, the laser output shows severe distortion if the pump radiation is 100% square wave modulated at 10 Hz.

Figure 2:
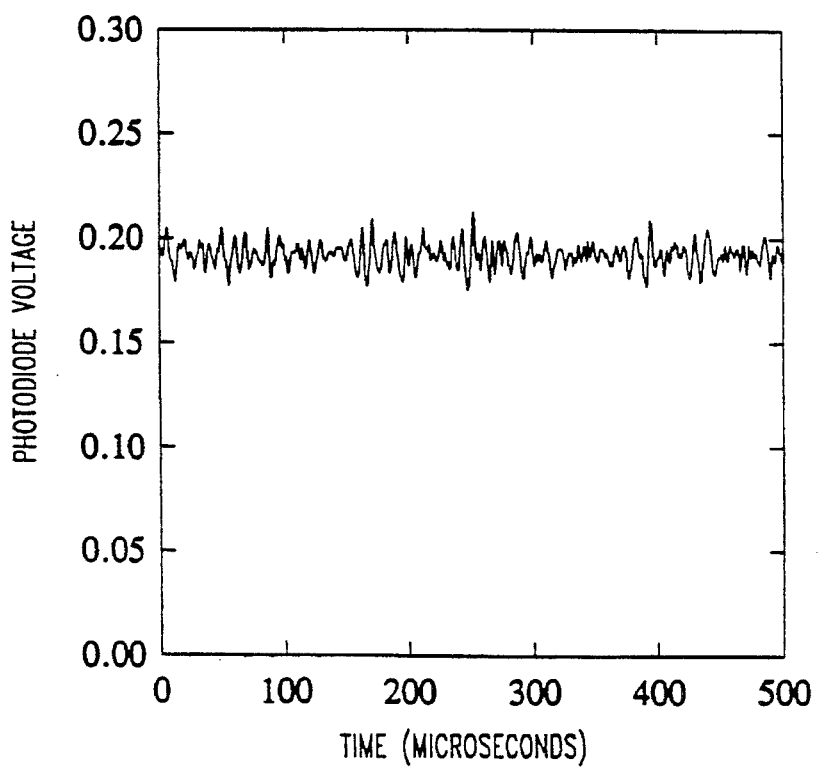
FIGS. 2 and 4 show the output of the exemplary fiber laser with feedback.
Figure 4:
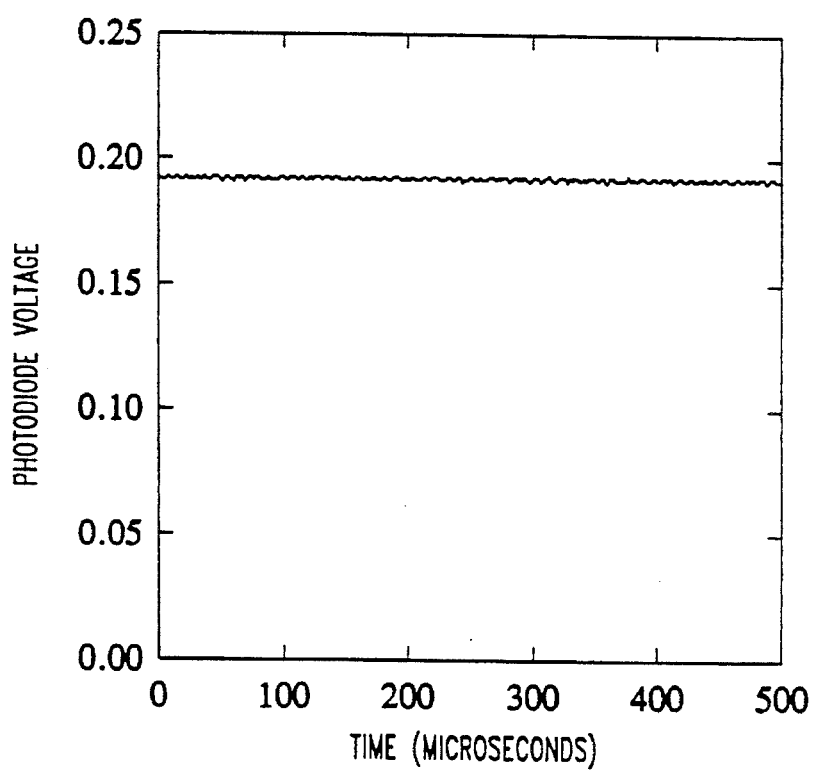

However, we have now discovered that provision of appropriate feedback can at least substantially reduce the undesirable output amplitude fluctuations in Er-doped lasers, and can be expected to have similar utility in other rare earth (e.g., Pr)-doped lasers. See, for instance, FIGS. 2 and 4, which correspond to the situations of FIGS. 1 and 3, respectively, but with feedback present. Thus, in a broad aspect the invention is embodied in an article (e.g., an optical transmitter or an optical fiber communication system) that comprises an optical waveguide laser, and that further comprises feedback means for reducing or preventing output amplitude fluctuations.

More specifically, the invention typically is embodied in an article that comprises an optical waveguide laser that comprises an optical waveguide, a semiconductor source of pump radiation of wavelength $\lambda_p$, means for coupling said pump radiation into said waveguide, and means for providing a drive current to said source of pump radiation. The laser has an output that comprises radiation of wavelength $\lambda_s > \lambda_p$, and the article optionally comprises means for utilizing said radiation of wavelength $\lambda_s$ (the "signal" radiation). Significantly, the article further comprises means for detecting a portion of the (optionally amplified) signal radiation output, said detector means to provide an electrical output that is indicative of the signal radiation amplitude, means for shifting the phase of said electrical output and/or for amplifying said electrical output, and means for providing said phase shifted and/or amplified electrical output to said means for providing a drive current to the pump radiation source such that said drive current is responsive to the amplitude of the signal radiation.

Those skilled in the art will recognize that the disclosed article comprises a feedback loop which has an electronic as well as an optical portion, the latter comprising the appropriately modulated pump radiation.

Figure 5:
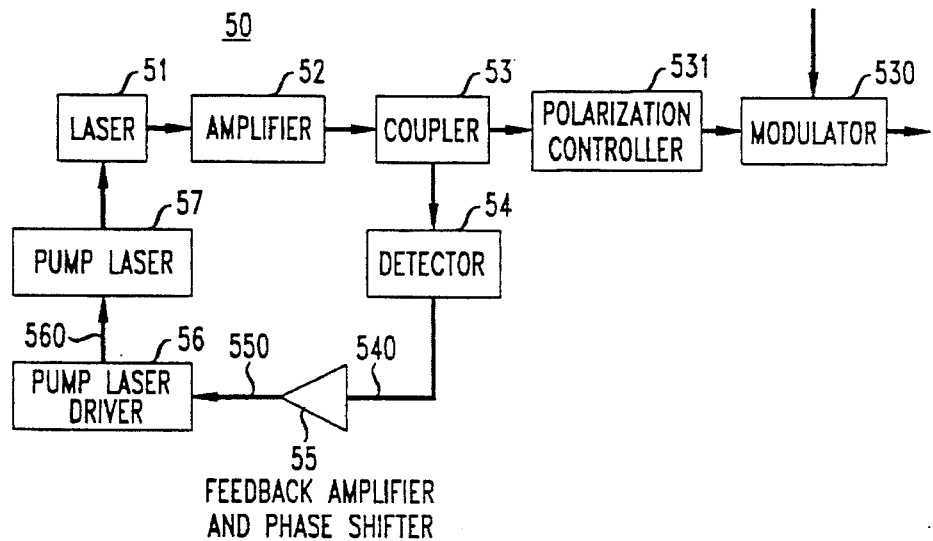
FIG. 5 schematically shows the relevant part of an exemplary communication system according to the invention.

FIG. 5 schematically depicts the relevant aspects of an exemplary transmitter portion 50 of an optical communication system according to the invention. Radiation from pump laser 57 is coupled into optical fiber laser 51, designed to emit single mode radiation of wavelength $\lambda_s$. The laser output is amplified in known optical amplifier 52 and divided in coupler 53. The radiation from one of the output ports of 53 is, after passage through optional polarization controller 531 and modulation in accordance with an appropriate signal in modulator 30, coupled into a conventional transmission fiber (not shown). The radiation from the other output port of 53 is caused to impinge on known detector 54. The electrical output signal 540 of 54 is appropriately amplified and/or phase shifted in conventional feedback amplifier and phase shifter 55, and the electrical output 550 of 55 is fed to known pump laser driver 56. Signal 550 serves to control the electrical output signal 560 of driver 56, and thereby to control the radiation output of pump laser 57 so as to provide negative feedback to laser 51.

Those skilled in the art will appreciate that the arrangement of FIG. 5 is exemplary only and that other arrangements could also be used. For instance, amplifier 52 could be taken out of the feedback loop, exemplarily placing 52 downstream of modulator 530. A separate pump laser and driver would in that case typically be provided for the amplifier.

Figure 6:
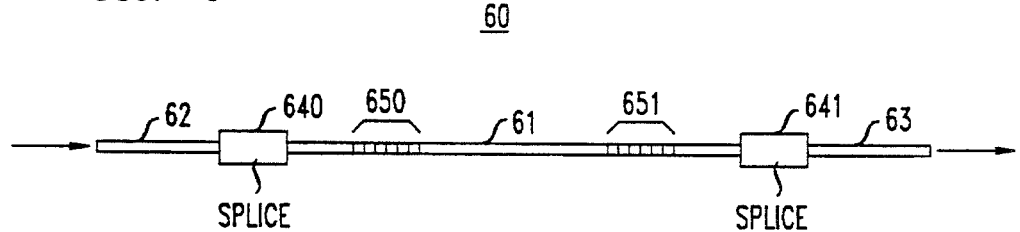
FIG. 6 shows schematically an exemplary fiber laser that can be used to practice the invention.

FIG. 6 schematically shows relevant aspects of an optical fiber laser 60 that can advantageously be used in the practice of the invention. Er-doped fiber 61 comprises two spaced apart known refractive index gratings (650, 651) which define the laser cavity. The output coupler grating 651 has relatively low (e.g., about 98%) peak reflectance for signal radiation, and the rear reflector 650 has relatively high (e.g., >99% ) peak reflectance. Grating bandwidths exemplarily are in excess of 0.5 nm. The Er-doped fiber is connected, by means of splice 640 (typically a fusion splice) to conventional fiber 62, with pump radiation (exemplarily $\lambda_p$=0.98 μm) transmitted through splice 640 and grating 650 into the laser cavity. Signal radiation is emitted primarily in the forward direction, coupled into fiber 63 by means of splice 641.

Exemplarily, we have used Er-doped fiber that had a gennano-silicate core, co-doped with Al and containing about 600 ppm (cation molar ppm) of Er, distributed nominally uniformly across the core. The core had effective diameter 2.6 μm and index difference Δn=0.023. The fiber had a cut-off wavelength of 0.88 μm, and an unpumped loss at 1.53 μm of 0.1 dB/cm. The total length of Er-doped fiber (splice-to-splice) was about 4.4 cm, and the effective cavity length was 2.5 cm. Those skilled in the art will appreciate that the laser of FIG. 6 can be operated with or without feedback, with use of feedback according to the invention being preferred. They will also appreciate that polarizing fiber or polarization-maintaining fiber can advantageously be used in a fiber laser and fiber amplifier.

Figure 7:
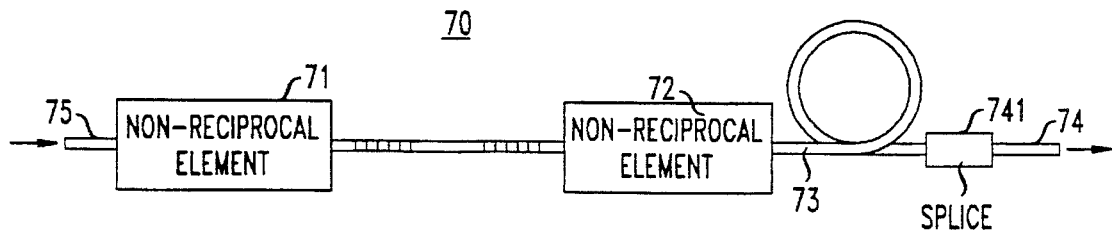
FIG. 7 schematically presents a preferred pump laser/waveguide laser/waveguide amplifier arrangement.

FIG. 7 schematically depicts a different, and currently preferred, arrangement, wherein numeral 70 refers to a fiber laser, and numerals 71 and 72 refer to non-reciprocal elements such as wideband isolators. The non-reciprocal elements respectively eliminate reflection of pump power back into the pump laser (e.g., a 1490 nm semiconductor laser), and reflection of signal radiation back into the fiber laser. Suitable isolators are known, and are commercially available. Exemplarily, they can provide >65 dB rerum loss at 1.54 μm, and >35 dB return loss at 1.49 μm. Signal radiation as well as pump radiation are transmitted through 72 into amplifier fiber 73, and the amplified signal radiation (and possibly a minor amount of pump radiation) is transmitted through splice 741 into conventional transmission fiber 74. A further non-reciprocal element (not shown) can optionally be inserted between amplifier and transmission fiber. An appropriate feedback loop (not shown) is advantageously provided, in a manner substantially as described above. Exemplarily, the amplifier comprises 45 m of Er-doped fiber, providing about 4 mW of output power from about 50 μW of input, with a single pump laser serving both the fiber laser and the fiber amplifier. Use of a single pump laser is, of course, optional.

Isolators are not the only type of non-reciprocal element that can be used in the arrangement of FIG. 7. For instance, isolator 71 can be replaced by an appropriately tilted wavelength filter that is selected to pass pump radiation and to block signal radiation. Appropriate tilting causes the filter to block reflected pump radiation by directing it away from the core of fiber 75. Filters suitable for the indicated use are commercially available, e.g., AT&T's OPF2001A filter which passes 1.48 μm pump radiation and rejects 1.55 μm signal radiation. We refer herein to all suitable elements collectively as "isolation means", whether or not they are conventionally considered to be "non-reciprocal" elements.

The combination of FIG. 7, with or without a feedback loop, will typically exhibit substantially improved stability, as compared to prior art pump/oscillator/amplifier combinations that lack isolation means 71 and/or 72, and thus will typically be a preferred implementation of such a combination. Those skilled in the art will appreciate that isolation means 71 may, if desired, be combined with the pump laser into a single unit.

Figure 8:
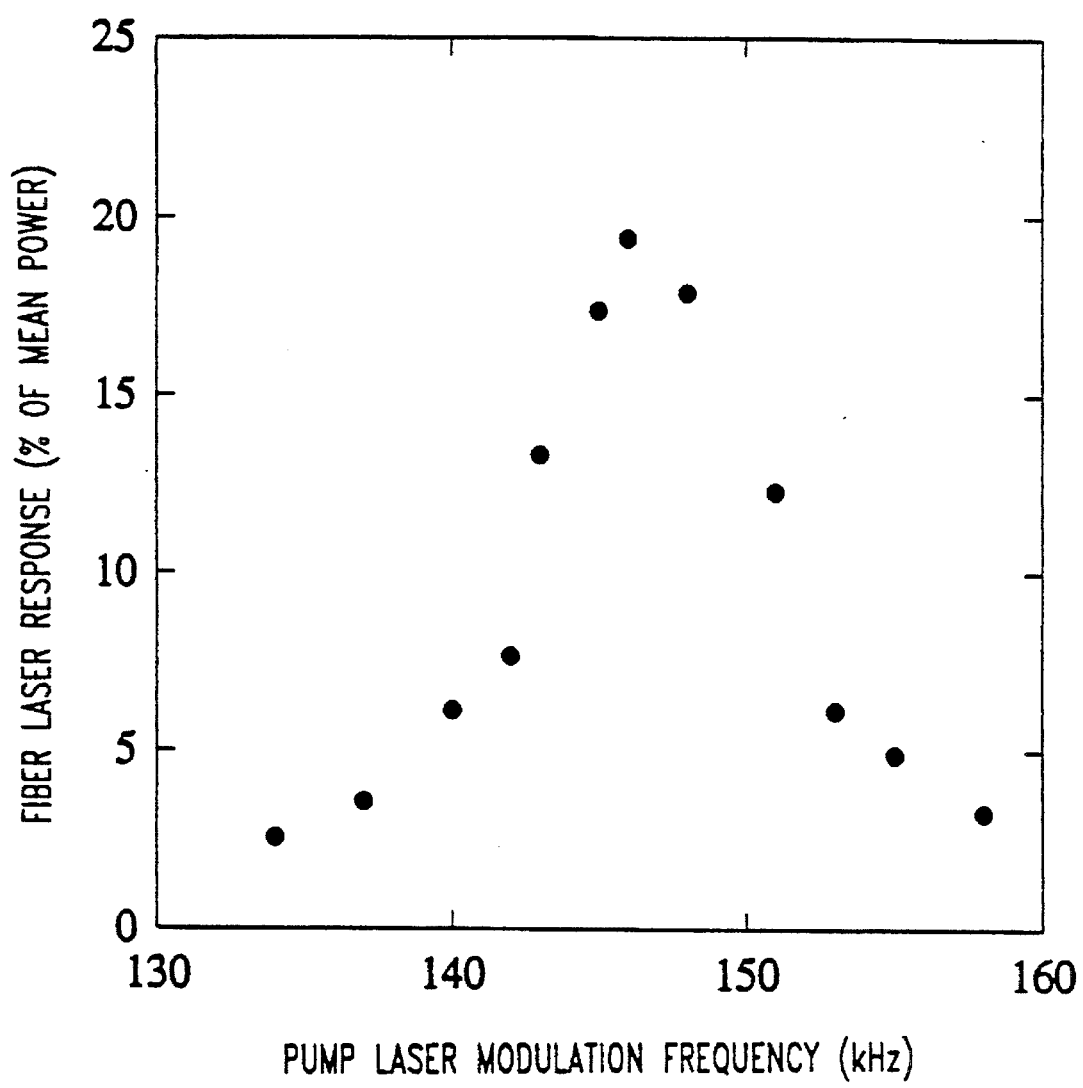
FIG. 8 presents exemplary data on fiber laser response as a function of pump laser modulation frequency.

As discussed above, we have discovered that, despite the normally slow response of Er-doped fluorescent devices to pump power modulation (due to the about 10 ms upper state lifetime of $Er^{3+}$), relatively high frequency pump power fluctuations can drive fiber laser output oscillations. We have found that these fluctuations are due to a resonance phenomenon. This is shown by FIG. 8, which presents, as a function of modulation frequency, the response of a fiber laser to a 0.5% modulation of the pump amplitude. The resonant nature of the phenomenon is apparent from FIG. 8.

Figure 12:
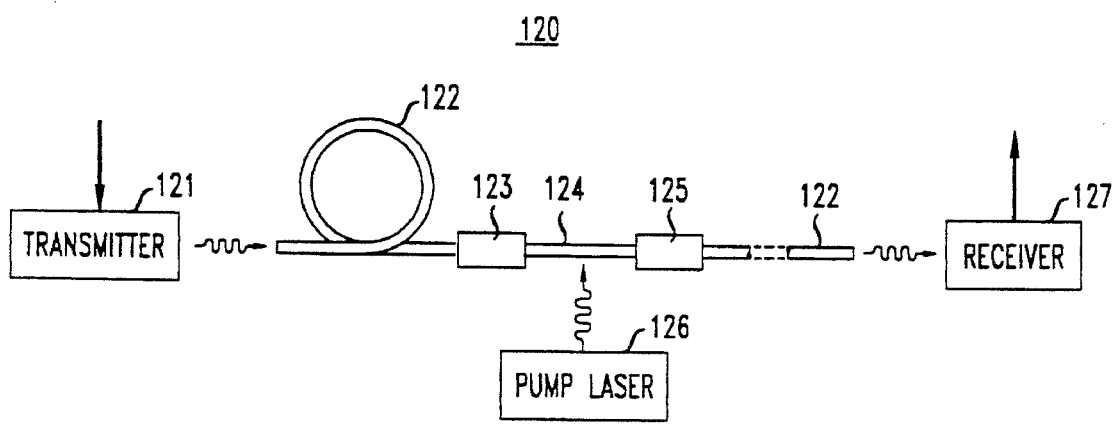
FIG. 12 schematically shows an exemplary optical communication system according to the invention.

FIG. 12 schematically depicts an optical communication system 120, wherein transmitter 121 comprises a pump/fiber laser/fiber amplifier combination according to the invention. The remainder of the system can be conventional. Transmitter output radiation, modulated in accordance with an external signal, is coupled into optical transmission fiber 122. Amplifier fiber 124 is spliced (123, 125) between lengths of transmission fiber, with pump radiation from pump laser 126 being coupled into the amplifier fiber. Receiver 127 detects the modulated output radiation at the end of the fiber transmission path and produces an electrical output in response to the optical signal.

Example 1

Figure 11:
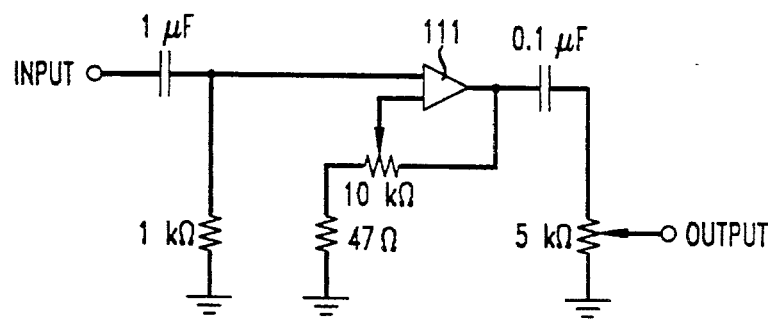
FIG. 11 shows the circuit diagram of an exemplary feedback amplifier.

A set-up substantially as shown in FIG. 5 was provided. The only significant difference was the absence of coupler 53, polarization controller 531 and modulator 530 in the exemplary set-up. The laser was a Er-doped Si-based fiber with in-line refractive index gratings, and the amplifier was 45 meters of Er-doped Si-based fiber, both as described above. The pump laser was an Anritsu model SD3F101F 1.48 μm laser diode, the pump laser driver a Light Control Instruments, Inc. Model 920 laser diode driver, and the detector a Ge photodiode. The feedback amplifier circuit is shown in FIG. 11. It will be appreciated that the circuit is exemplary only, and that many other circuits can be readily devised. FIG. 11 does not show an explicit phase shift network, which was not required in the exemplary set-up. Phase shift circuits are well known. See, for instance, "National Semiconductor Linear Applications Handbook", 1986, p. 114. Amplifier 111 in FIG. 11 is a National Semiconductor LH0032 FET-input operational amplifier. Many other known amplifiers could also be used. The described set-up resulted in stable laser output (see FIGS. 2 and 4) at a wavelength of about 1538 nm.

Example 2

A set-up substantially as shown in FIG. 7 was used to generate 1.54 μm signal radiation. The pump laser was a conventional 1.48 μm semiconductor laser. Isolation means 71 was a wavelength filter as described above, and isolation means 72 was a conventional isolator (FDK single stage YIG optical isolator YD340-3-155S). 35 m of Er-doped fiber served as amplifier. Downstream from splice 741 was a second conventional isolator (not shown in FIG.7), which was coupled by means of a commercially available angled connector to standard (AT&T 5D) optical fiber. The set-up produced a stable single mode output at 1540 nm. Removal of isolator 72 resulted in an output that contained further modes.

Example 3

To the set-up of Example 2 is added a feedback loop substantially as described. The resulting output is highly stable single mode 1540 nm radiation.

We claim:

1. An article comprising an optical waveguide laser having an output that comprises signal radiation of wavelength $\lambda_s$; the article further comprising a) a semiconductor source of pump radiation of wavelength $\lambda_p$, with $\lambda_p < \lambda_s$;

b) means for coupling said pump radiation into said laser; and c) means for utilizing said signal radiation;

CHARACTERIZED IN THAT the means of c) comprises d) an optical amplifier coupled to said laser such that signal radiation from the laser and pump radiation are coupled into the amplifier, with amplified signal radiation from the amplifier provided to the means of c); and e) first isolation means, situated between the laser and the amplifier and adapted for permitting passage of radiation of wavelength $\lambda_p$ and $\lambda_s$ from the laser to the amplifier, and furthermore adapted for at least substantially blocking passage of radiation of wavelength $\lambda_s$ from the amplifier to the laser.

2. Article according to claim 1, wherein each of the laser and the amplifier comprises Er-doped optical fiber.

3. Article according to claim 1, wherein said first isolation means comprise an optical isolator or a tilted wavelength filter.

4. Article according to claim 1, wherein the means of b) comprise an optical waveguide transmission path that radiation-transmissively connects said source of pump radiation and said laser, said transmission path comprising second isolation means adapted for permitting propagation of radiation of wavelength $\lambda_p$ from said source of pump radiation to said laser, and furthermore adapted for at least substantially blocking passage of radiation of wavelength $\lambda_s$ propagating from said laser towards said source of pump radiation.

5. Article according to claim 4, wherein said second isolation means comprise a tilted wavelength filter or an optical isolator.

6. Article according to claim 1, further comprising third isolation means positioned downstream from said amplifier.

7. Article according to claim 1, wherein $\lambda_s$ is about 1.55 μm and $\lambda_p$ is about 1.48 μm.

8. Article according to claim 1, further comprising means for providing a drive current to said source of pump radiation, and still further comprising feedback means selected such that the drive current provided to the source of pump radiation is responsive to the amplitude of the output of wavelength $\lambda_s$ of the optical fiber laser.

9. An article comprising a) a source of pump radiation of wavelength $\lambda_p$;

b) an optical fiber laser having an output that comprises signal radiation of wavelength $\lambda_p < \lambda_s$;

c) means for coupling said pump radiation into said laser;

d) an optical fiber amplifier coupled to the laser such that signal radiation from the laser and pump radiation are coupled into the amplifier, with amplified signal radiation from the amplifier coupled into a length of optical fiber connected to signal radiation utilization means;

e) first isolation means situated between the laser and the amplifier and adapted for permitting passage of radiation of wavelength $\lambda_p$ and radiation of wavelength $\lambda_s$ from the laser to the amplifier, and furthermore adapted for at least substantially blocking passage of radiation of wavelength $\lambda_s$ from the amplifier to the laser; wherein f) each of the laser and the amplifier comprises Er-doped optical fiber, $\lambda_s$ is about 1.55 μm, $\lambda_p$ is about 1.48 μm, the length of optical fiber comprises single mode transmission fiber, and the article is an optical fiber communication system.

10. Article according to claim 9, wherein said means for coupling the pump radiation into the laser comprise second isolation means adapted for permitting passage of radiation of wavelength $\lambda_p$ from the source of pump radiation to the laser, and furthermore adapted for at least substantially blocking passage of radiation of wavelength $\lambda_p$ from the laser to the source of pump radiation.

11. Article according to claim 10 comprising third isolation means situated in the downstream direction from the amplifier, the third isolation means adapted for passage of radiation of wavelength $\lambda_s$ in the downstream direction, and furthermore adapted for at least substantially blocking passage of radiation of wavelength $\lambda_s$ through the third isolation means in the upstream direction.

12. Article according to claim 9, comprising third isolation means situated in the downstream direction from the amplifier.

13. Article according to claim 9, wherein $\lambda_s$ is 1.54 μm.

* * * * *